(12) United States Patent
Baker et al.

(10) Patent No.: US 9,839,053 B2
(45) Date of Patent: Dec. 5, 2017

(54) RADIO COMMUNICATION STATION AND RADIO COMMUNICATION DEVICE, AND METHODS OF OPERATING SAME

(71) Applicant: KONINKLIJKE PHILIPS N.V., Eindhoven (NL)

(72) Inventors: Matthew P. J. Baker, Canterbury (GB); Timothy J. Moulsley, Redhill (GB); Filippo Tosato, Redhill (GB); Domenico Porcino, Reggio Calabria (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/009,186

(22) Filed: Jan. 28, 2016

(65) Prior Publication Data

US 2016/0150567 A1    May 26, 2016

Related U.S. Application Data

(62) Division of application No. 13/903,269, filed on May 28, 2013, now Pat. No. 9,281,956, which is a division
(Continued)

(30) Foreign Application Priority Data

Aug. 9, 2006  (EP) .................................... 06118696

(51) Int. Cl.
*H04W 74/08* (2009.01)
*H04L 1/00* (2006.01)
(Continued)

(52) U.S. Cl.
CPC ........... *H04W 74/085* (2013.01); *H04L 1/003* (2013.01); *H04L 1/0003* (2013.01);
(Continued)

(58) Field of Classification Search
CPC ...................... H04W 72/0446; H04W 72/0453
See application file for complete search history.

(56) References Cited

U.S. PATENT DOCUMENTS 6,487,528 B1   11/2002  Voessing et al.
8,472,938 B2   6/2013   Baker et al.
(Continued)

FOREIGN PATENT DOCUMENTS

CN     1777081 A       5/2006
JP     2008526125 A    7/2008

OTHER PUBLICATIONS

NNT-DOCUMO, Fujitsu, NEC, Sharp, Toshiba, "Non-Synchronized Random Access Procedure for E-Ultra Uplink", 3GPP RAN WG1 LTE Ad Hoc: R1-061660 [Online] Jun. 27-30, 2006, pp. 1-6, XP002467017, Retrieved From the Internet: URL: www.3gpp.org.
(Continued)

*Primary Examiner* — Diane Mizrahi

(57) ABSTRACT

A radio communication station in a radio communication system having a plurality of radio communication devices, derives a quantization parameter from control indications received from respective radio communication devices and transmits the quantization parameter to the radio communication devices on at least one downlink channel. The radio communication devices receive the quantization parameter, determine respective channel state metrics for the downlink channel, respectively quantize the determined respective channel state metrics by applying quantization ranges indicated by the quantization parameter, determine respective control indications indicative of the respective quantized channel state metrics, and transmit to the radio communication station respective signals indicating the determined respective control indications as respective random access transmissions on an uplink channel.

56 Claims, 2 Drawing Sheets

| Signalled value | CQI/dB according to uniform quantisation | CQI / dB according to the invention |
|---|---|---|
| 1 | 0-3.8 | 0-10.4 |
| 2 | 3.8-7.5 | 10.4-12.3 |
| 3 | 7.5-11.3 | 12.3-13.7 |
| 4 | 11.3-15.0 | 13.7-15.0 |
| 5 | 15.0-18.8 | 15.0-16.3 |
| 6 | 18.8-22.5 | 16.3-17.7 |
| 7 | 22.5-26.3 | 17.7-19.6 |
| 8 | 26.3-30 | 19.6-30 |

Related U.S. Application Data of application No. 12/376,581, filed as application No. PCT/IB2007/053145 on Aug. 8, 2007, now Pat. No. 8,472,938.

(51) Int. Cl.
    *H04W 74/00*     (2009.01)
    *H04L 12/26*     (2006.01)
    *H04W 72/04*     (2009.01)

(52) U.S. Cl.
    CPC ........ *H04L 1/0026* (2013.01); *H04L 12/2618* (2013.01); *H04W 72/0446* (2013.01); *H04W 72/0453* (2013.01); *H04W 74/004* (2013.01); *H04W 74/006* (2013.01); *H04W 74/008* (2013.01); *H04W 74/0833* (2013.01)

(56) References Cited

U.S. PATENT DOCUMENTS

| | | | |
|---|---|---|---|
| 8,594,051 B2 | 11/2013 | Breit et al. | |
| 9,246,842 B2* | 1/2016 | Oyman | H04W 24/06 |
| 2008/0165874 A1 | 7/2008 | Steele et al. | |
| 2008/0268862 A1 | 10/2008 | Kent | |
| 2008/0273624 A1 | 11/2008 | Kent et al. | |
| 2008/0310542 A1 | 12/2008 | Gao et al. | |
| 2010/0046402 A1 | 2/2010 | Forck et al. | |
| 2011/0211656 A1 | 9/2011 | Kent et al. | |
| 2012/0172081 A1* | 7/2012 | Love | H04W 52/367 |
| | | | 455/522 |

OTHER PUBLICATIONS

Masson Romain, "XR-EE-KT-2006_002: E-UTRA Rach Within the LTE System", Internet Citation, [Online] Feb. 3, 2006, XP002456636 Retrieved From the Internet: URL:http://www.ee.kth.se/php/modules/publication/reports/2006.

Philips, "Effect of CQI Quantization on Rach Collision Probabilities", 3GPP TSG-RAN WG2 #55, R2-062938, [Online] Oct. 9, 2006, Oct. 13, 2006, pp. 1-9, XP002457018 Retrieved From the Internet: URL:www.3gpp.org.

* cited by examiner

| Signalled value | CQI/dB according to uniform quantisation | CQI / dB according to the invention |
|---|---|---|
| 1 | 0-3.8 | 0-10.4 |
| 2 | 3.8-7.5 | 10.4-12.3 |
| 3 | 7.5-11.3 | 12.3-13.7 |
| 4 | 11.3-15.0 | 13.7-15.0 |
| 5 | 15.0-18.8 | 15.0-16.3 |
| 6 | 18.8-22.5 | 16.3-17.7 |
| 7 | 22.5-26.3 | 17.7-19.6 |
| 8 | 26.3-30 | 19.6-30 | ued# RADIO COMMUNICATION STATION AND RADIO COMMUNICATION DEVICE, AND METHODS OF OPERATING SAME This application is a Division of application Ser. No. 13/903,269 filed May 28, 2013, which a Division of application Ser. No. 12/376,581 filed Feb. 6, 2009 (now U.S. Pat. No. 8,472,938 issued Jun. 25, 2013) which is a National Phase application under 35 CFR 371 of International Application PCT/IB2007/053145 filed Aug. 8, 2007 and claims foreign priority of EPO 06118696.1 filed Aug. 9, 2006.

The invention relates to a radio communication apparatus and to a method of operating a radio communication apparatus. The invention has application in, for example but not exclusively, mobile communication systems.

Mobile communication systems typically incorporate mechanisms to transmit information about the state of a radio channel. For example, channel state information can be sent as part of the random access mechanism by which mobile terminals can access a network. In one example of a random access mechanism which is under consideration for the UMTS LTE (Universal Mobile Telecommunication System Long Term Evolution) a mobile terminal transmits a signature on an asynchronous random access channel (RACH). The mobile terminal selects a particular signature from a larger set (e.g. of 64), which enables a few bits (e.g. 6) of information to be conveyed. One requirement is that the collision probability (i.e. probability that two mobile terminals use the same signature at the same time) should be sufficiently low. A further requirement is that the resulting waveforms have low cross-correlation.

The bit pattern defining the signature can be considered in terms of one or more data fields. Some examples of the potential contents of the data fields are:
  Pseudo-random data (in the form of a temporary mobile terminal identity to reduce the risk of collision)
  Channel quality indicator (CQI) or pathloss measurement
  Reason for RACH access The CQI and Reason fields may also help to reduce collisions if they are sufficiently uncorrelated between terminals.

The example mechanism described above suffers from competing problems of the limited number of useful data bits which can be sent, and the potential collision probability.

An object of the invention is to enable an improved random access mechanism.

According to a first aspect of the invention there is provided a method of operating a radio communication station in a radio communication system having a plurality of radio communication devices, comprising deriving a quantisation parameter and transmitting the quantisation parameter to the radio communication devices for use in subsequent quantisation of a channel state metric.

According to a second aspect of the invention there is provided a method of operating a radio communication device, comprising: receiving a quantisation parameter; determining a channel state metric; quantising the determined channel state metric by applying quantisation ranges indicated by the quantisation parameter; determining a data value indicative of the quantised channel state metric; and transmitting a signal conveying the determined data value as a random access transmission.

The invention also provides a method of operating a communication system comprising operating a radio communication station in accordance with the first aspect of the invention and operating a radio communication device in accordance with the second aspect of the invention.

According to a third aspect of the invention there is provided a radio communication station for use in a radio communication system having a plurality of radio communication devices, comprising means adapted to derive a quantisation parameter and means adapted to transmit the quantisation parameter to the radio communication devices for use in subsequent quantisation of a channel state metric.

According to a fourth aspect of the invention there is provided a radio communication device, comprising: means adapted to receive a quantisation parameter; means adapted to determine a channel state metric; means adapted to quantise the determined channel state metric by applying quantisation ranges indicated by the quantisation parameter; means adapted to determine a data value indicative of the quantised channel state metric; and means adapted to transmit a signal conveying the determined data value as a random access transmission.

The invention also provides a communication system comprising a radio communication station in accordance with the third aspect of the invention and a radio communication device in accordance with the fourth aspect of the invention.

Depending on the probability density function (PDF) of channel state metric values, and consequently of the data values, the collision probability may be higher than if random data alone was transmitted. In contrast to the invention, a fixed quantisation algorithm for quantising the data bits does not adapt to changes in the distribution of measured channel state metric values, and may therefore result in a high collision probability if a significant proportion of the mobile terminals measure substantially-similar values. The present invention alleviates this problem by enabling the quantisation algorithm to be adapted.

The quantisation parameter may be derived dependent on a characteristic of the radio communication system. This enables the radio communication station to adapt the quantisation parameter to time-varying system characteristics.

The characteristic of the radio communication system may be derived from signals received on a random access channel from a plurality of radio communication devices. This enables the radio communication station to adapt the quantisation parameter to, for example, the activity level and signal quality of the radio communication devices.

The signals received on the random access channel from the plurality of radio communication devices, may each convey a data value indicative of a quantised channel state metric of the respective radio communication device, and the radio communication station may derive the quantisation parameter dependent on the data values. This enables the radio communication station to adapt the quantisation parameter to the channel state metrics. Different sets of data values may be conveyed by different time and/or frequency resource slots.

The radio communication station may derive the quantisation parameter dependent, for example, on the frequency of occurrence of different data values. This enables the radio communication station to adapt the quantisation parameter to control the number of collisions of the signals transmitted by the radio communication devices. In particular the quantisation parameter may be adjusted to reduce the frequency of occurrence of the most frequently occurring data values, thereby reducing the number of collisions.

The quantisation parameter may be indicative of quantisation ranges at least some of which have unequal width. This also enables the number of collisions to be controlled.

Different data values may be conveyed by different time and/or frequency resource slots. The different resource slots may correspond to quantisation ranges having different widths. These features also enable the number of collisions to be controlled.

The channel state metric may be indicative of one or more of:
- channel quality indicator for a received signal;
- channel transfer function;
- channel quality indicators for more than one frequency or frequency band;
- channel quality indicators for more than one antenna;
- average value of a channel quality indicators for more than one antenna;
- difference between channel quality indicators for more than one antenna;
- location of the radio communication device;
- angle of a receive path;
- requested data rate.

A channel quality indicator may, for example, comprise one or more of:
- a signal to noise ratio;
- a signal to interference ratio;
- a receivable data rate;
- a path loss.

The invention will now be described, by way of example only, with reference to the accompanying drawings wherein.

MODES FOR CARRYING OUT THE INVENTION

Embodiments of the invention will be described with reference to a mobile communication system in which the radio communication device may be a mobile terminal, such as a mobile phone, and the radio communication station may be a base station in a network.

According to the invention, at least one quantisation parameter for quantising data to be transmitted in a random access preamble is signalled to a mobile terminal. When the mobile terminal quantises data in accordance with the signalled parameter(s), the probability of occurrence of each of the data values that can be signalled in the preamble can be made more similar.

In general, according to the invention at least part of the data transmitted in the preamble signature would typically be non-uniformly quantised. The non-uniform quantisation would be designed to give a more uniform distribution of transmitted data values than would be the case with a uniform quantisation, based on an assumed or estimated PDF of the data to be transmitted. This reduces the risk of signature collisions between the RACH attempts of different mobile terminals. This improvement is accompanied by a reduction in the resolution of the transmitted data around the least-probable ranges of values.

In a simple embodiment, the signalled quantisation parameter may comprise the highest and lowest quantisation levels to be used. This would indicate that all measured values above the highest quantisation level or below the lowest quantisation level would be sent with the highest or lowest data value respectively.

Quantisation in the region between the highest and lowest levels could be carried out using a predetermined granularity, for example determined by the number of bits available for data transmission.

Figures 1, 2:
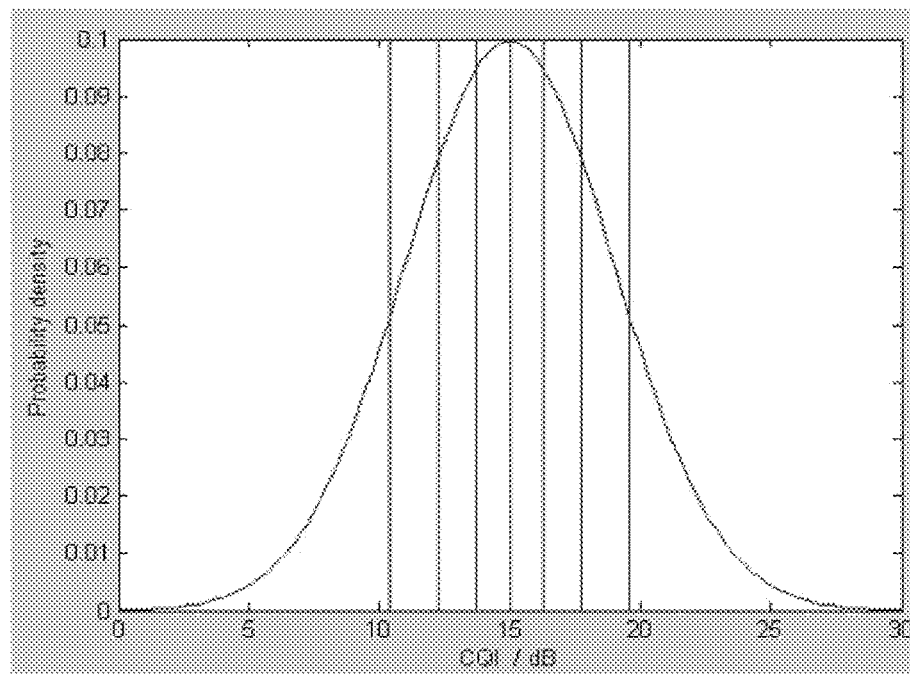
FIG. 1 is an example PDF of CQI values and ideal quantisation thresholds for maximum randomisation of transmitted values.
FIG. 2 is a table of example quantisation ranges and corresponding data values.

For example, FIG. 1 shows an example of a PDF of CQI values which may, for example, be assumed to follow a log-normal distribution. In this case, the quantisation thresholds for mapping CQI values to data bits to be transmitted in the preamble are ideally selected so as to give a substantially uniform distribution of the data bits to be transmitted. FIG. 1 shows where the quantisation levels would be placed following this ideal assumption; the mapping shown in FIG. 2 would be used between the CQI value in dB and the signalled data bits, for a case when 3 bits are used to represent CQI in the preamble signature.

It can be seen from FIG. 1 that the quantisation thresholds are substantially evenly-spaced within a limited range of the full set of values.

An approximation to this quantisation pattern is to apply evenly-spaced thresholds between the highest and lowest thresholds. For example, in the simple embodiment described above, highest and lowest thresholds of 19.5 dB and 10.5 dB respectively would be signalled to the mobile terminals.

Figure 3:
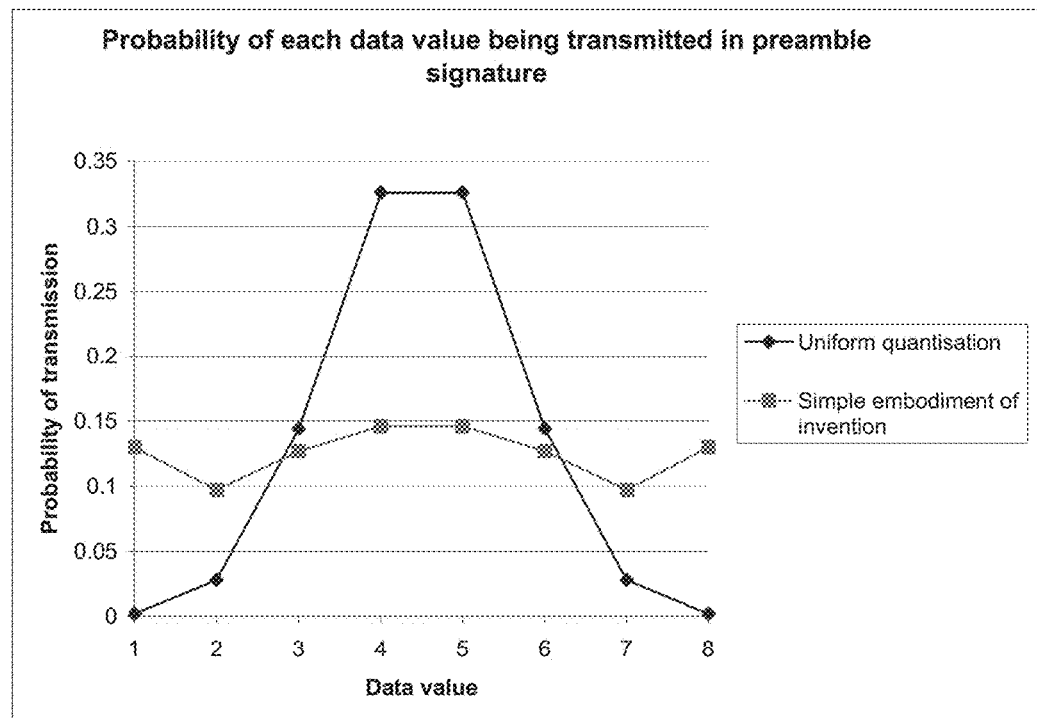
FIG. 3 is an example PDF for unequal quantisation ranges.

Knowing the number of bits available for data reporting (in this example 3), and hence the fact that 8 data values are available, the mobile terminal can then position equidistantly intermediate thresholds at 12 dB, 13.5 dB, 15 dB, 16.5 dB and 18 dB. This results in the probabilities of transmission of each of the available data values being as shown in FIG. 3.

More advanced embodiments can include the signalling of additional parameters. For example:
- The levels of more than two of the quantisation thresholds could be signalled to the mobile terminals, together with an indicator of the number of quantisation thresholds (or bands), or the quantisation threshold spacing, between each of the signalled thresholds.
- More advanced functions of the quantisation threshold spacing could also be signalled between one or more pairs of the signalled quantisation thresholds. For example, the gradient of the quantisation threshold spacing could be signalled, or the coefficients of a polynomial function of the quantisation threshold spacing.

Figure 4:
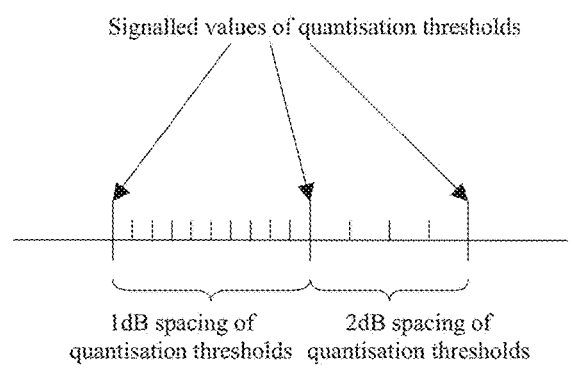
FIG. 4 illustrates another example of quantisation thresholds.

A further example is shown in FIG. 4, where the values of three quantisation thresholds are signalled to the mobile terminals, together with indicators that a 1 dB spacing should be used for the quantisation thresholds between the first and second signalled quantisation thresholds and a 2 dB spacing should be used for the quantisation thresholds between the second and third signalled quantisation thresholds.

The quantisation parameter selection shown in FIG. 4 can, for example, take into account the fact that it may be desirable, in the case of CQI reporting, to report CQI values more accurately at low values of SINR (signal to interference and noise ratio) than at higher values.

Thus the exact choice of quantisation parameters can be based on a combination of the aim of randomising the transmitted data values to minimise collision probability, and consideration of the effect of higher or lower degrees of accuracy in the data values.

The quantisation parameter(s) may be selected according to the deployment scenario (e.g. indoor, outdoor or macro/pico cell), or current traffic conditions.

The invention may also be applied to other kinds of information than CQI (including further channel state metrics). For example:

Channel transfer function
CQI for more than one frequency or frequency band
CQI for more than one antenna
Average CQI for more than one antenna
Different CQI between antennas
Location of the UE
Angle of the path from the UE to the access point
Required data rate The signalling of quantisation parameters may be configurable (e.g. only applied under high loading conditions, when collisions are more likely).

The signalling of the quantisation parameters may be updated according to measurements of the PDF of data received in actual preambles.

The quantisation parameter(s) may be derived dependent on, for example:

CQI reports transmitted on different channels
current cell size
handover measurements.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and which may be used instead of or in addition to features already described herein.

INDUSTRIAL APPLICABILITY

Wireless communication systems, for example UMTS LTE or other cellular systems such as UMTS WCDMA (Wideband Code Division Multiple Access).

The invention claimed is:

1. A method of operating a radio communication station in a radio communication system having a plurality of radio communication devices, the method comprising:
    receiving via an indication receiver, respective control indications in signals on a random access channel from the plurality of radio communication devices;
    deriving in a characteristic deriver, a characteristic of the radio communication system from the received respective control indications;
    deriving in a quantization deriver, a quantization parameter depending on the characteristic; and
    transmitting via a parameter transmitter, the quantization parameter to the plurality of radio communication devices for use in subsequent respective quantizations of respective channel state metrics.

2. The method of claim 1, wherein the respective control indications in the signals received on the random access channel indicate respective channel state metrics quantized using a previous quantization parameter.

3. The method of claim 1, wherein the respective control indications in the signals received on the random access channel indicate respective quantized channel state metrics of respective radio communication devices.

4. The method of claim 3, wherein deriving a characteristic of the radio communication system, comprises deriving the control indications from the signals received on the random access channel.

5. The method of claim 4, wherein deriving the quantization parameter depending on a characteristic of the radio communication system, comprises deriving the quantization parameter depending on the control indications.

6. The method of claim 3, wherein deriving the quantization parameter is dependent on the frequency of occurrence of different control indications.

7. The method of claim 6, wherein the quantization parameter is adjusted to reduce the frequency of occurrence of the most frequently occurring control indications.

8. The method of claim 3, wherein different sets of control indications are indicated by different time resource, and/or different frequency resource slots, in random access transmissions from the at least one radio control device to the radio communication station.

9. The method of claim 1, wherein the quantization parameter is indicative of quantization ranges at least some of which have unequal width to provide: a more uniform distribution of data bits between different ranges, and a substantially more uniform distribution of data bits within the ranges, than would be provided by equal width ranges.

10. A method of operating a radio communication device in a radio communication system having a radio communication station, the method comprising:
    receiving via a parameter receiver, from a radio communication station a quantization parameter indicating quantization ranges;
    determining in a metric determiner, a channel state metric;
    quantizing in a metric quantizer the determined channel state metric by applying the quantization ranges indicated by the quantization parameter;
    determining in an indication determiner, a control indication that indicates the quantized channel state metric; and
    transmitting via a signal transmitter, a signal conveying the determined control indication as a random access transmission to the radio communication station.

11. The method of claim 10, wherein the determined control indication conveyed by the transmitted signal is indicative of the channel state metric quantized into ranges using the quantization parameter.

12. The method of claim 10 wherein the received quantization parameter is previously derived by a radio communication station depending on the frequency of occurrence of different previous control indications from different respective radio communication devices, and wherein the received quantization parameter is previously adjusted by the radio communication station to reduce the frequency of occurrence of the most frequently occurring values of the control indications, and wherein the radio communication station transmits the quantization parameter to the radio communication device.

13. The method of claim 10, wherein different control indications of different respective radio communication devices are conveyed by different respective signals transmitted on a random access channel using different respective time resource and/or frequency resource slots to the radio communication station.

14. The method of claim 10, wherein the quantization parameter is indicative of a threshold, and the method comprising the act of:
    if a value of the channel state metric for a radio communication device falls above the threshold, transmitting the signal conveying the control indication in a first time and/or frequency resource slot; and
if the value of the channel state metric for a radio communication device falls below the threshold, transmitting the signal conveying the control indication in a different second time and/or frequency resource slot.

15. The method of claim 10, wherein at least some of the quantization ranges of the quantization parameter have unequal width to provide a more uniform distribution of data bits between different ranges, and a substantially more uniform distribution of data bits within the ranges, than would be provided by equal width ranges.

16. The method of claim 10, wherein the channel state metric is indicative of one or more of the group of:
channel quality indicator for a received signal;
channel transfer function;
channel quality indicators for more than one frequency or frequency band;
channel quality indicators for more than one antenna;
average value of channel quality indicators for more than one antenna;
difference between channel quality indicators for more than one antenna;
location of the radio communication device;
angle of a receive path;
requested data rate;
receivable data rate;
path loss;
signal to noise ratio; and
signal to interference ratio.

17. The method of claim 10, of operating a radio communication device, wherein the radio communication station derives the quantization parameter to reduce the probability of collisions between transmissions of the radio communication devices.

18. The method of claim 10, of operating a radio communication device, wherein the radio communication station derives the quantization parameter to indicate a plurality of quantization ranges.

19. A method of operating a communication system having a radio communication station and a plurality of radio communication devices, comprising the acts of:
deriving by a system comprising a radio communication station and a plurality of radio communication devices, a quantization parameter indicating quantization ranges, the quantization parameter being derived from previous control indications dependent on a previous quantization parameter;
determining by the system, channel state metrics of respective radio communication devices;
quantizing by the system, the determined respective channel state metrics by applying quantization ranges indicated by the quantization parameter to produce respective quantized channel state metrics of respective radio communication devices;
determining by the system, respective control indications indicative of the respective quantized channel state metrics of respective radio communication devices; and
transmitted by the respective radio communication devices, respective signals as respective random access transmissions on a random access channel to the radio communication station, the respective random access transmissions conveying the respective control indications.

20. The method of claim 19, of operating a communication system, wherein the radio communication station derives the quantization parameter to indicate a plurality of quantization ranges.

21. The method of claim 19, of operating a communication system, wherein the quantization parameter is indicative of quantization ranges at least some of which have unequal width to provide: a more uniform distribution of data bits between different ranges, and a substantially more uniform distribution of data bits within the ranges, than would be provided by equal width ranges.

22. The method of claim 19, of operating a communication system, wherein the radio communication station derives the quantization parameter to reduce the probability of collisions between transmissions of the radio communication devices.

23. The method of claim 19 comprising:
receiving by the radio communications station, respective signals as respective random access transmissions on a random access channel from the respective radio communication devices, the respective signals indicating respective control indications indicating respective channel metrics quantized with the quantization parameter;
deriving by the radio communications station, the respective control indications from the respective signals received on the random access channel from respective radio communication devices;
deriving by the radio communications station, the quantization parameter depending on the previously received respective control indications; and
adjusting by the radio communications station the quantization parameter to reduce the frequency of occurrence of the most frequently occurring control indications.

24. The method of claim 19, of operating a radio communication system, wherein the received signals convey data values indicative of a channel metric quantized using a previous quantization parameter.

25. The method of claim 19, of operating a radio communication system, wherein the radio communication station derives the quantization parameter to reduce the probability of collisions between transmissions of the radio communication devices.

26. The method of claim 19, of operating a radio communication system, wherein the radio communication station derives the quantization parameter to indicate a plurality of quantization ranges.

27. A radio communication station for use in a radio communication system having a plurality of radio communication devices, comprising:
a parameter deriver configured to derive a quantization parameter for use by a radio communication device for subsequent quantization of respective channel state metrics of respective radio communications devices; and
a parameter transmitter configured to transmit the quantization parameter to the radio communication devices for subsequent quantization of respective channel state metrics of respective radio communications devices.

28. The radio communication station of claim 27, comprising:
a signal receiver configured to receive signals on a random access channel from the plurality of radio communication devices; and
an indication deriver configured to derive control indications from the received signals.

29. The radio communication station of claim 28, comprising a characteristic deriver configured to derive a characteristic of the radio communication system from the control indications conveyed by the received signals; and wherein deriving the quantization parameter depends on the characteristic.

30. The radio communication station of claim 29, wherein the respective signals received on the random access channel convey respective control indications of quantized respective channel state metrics of respective radio communication devices.

31. A radio communication station of claim 30, comprising a deriver configured to derive the respective control indications from the respective signals received on the random access channel from respective radio communication devices.

32. A radio communication station of claim 31, wherein deriving the quantization parameter depends on the control indications.

33. A radio communication station of claim 32, wherein deriving the quantization parameter depends on the frequency of occurrence of different control indications.

34. A radio communication station of claim 33, comprising a parameter adjuster configured to repeatedly adjust the quantization parameter to reduce the frequency of occurrence of the most frequently occurring control indications.

35. The radio communication station of claim 32, comprising an indication determiner configured to determine different sets of control indications from different time and/or frequency resource slots.

36. The radio communication station of claim 27, wherein the quantization parameter is indicative of a threshold.

37. The radio communication station of claim 27, wherein the quantization parameter is indicative of quantization ranges at least some of which have unequal width to provide a more uniform distribution of data bits between different ranges, and a substantially more uniform distribution of data bits within the ranges, than would be provided by equal width ranges.

38. The radio communication station of claim 27, wherein the radio communication station derives the quantization parameter to reduce the probability of collisions between transmissions of the radio communication devices.

39. The radio communication station of claim 27, wherein the radio communication station derives the quantization parameter to indicate a plurality of quantization ranges.

40. The radio communication station of claim 27, wherein the quantization parameter is indicative of quantization ranges at least some of which have unequal width to provide a more uniform distribution than equally spaced ranges and a substantially uniform distribution of data bits in the ranges.

41. A radio communication system having a radio communication station and a plurality of radio communication devices, comprising:
a parameter deriver configured to derive a quantization parameter having quantization ranges;
a parameter transmitter configured to transmit the quantization parameter to respective radio communication devices;
a metrics determiner configured to determine respective channel state metrics of respective radio communication devices;
a metrics quantizer configured to quantize respective determined channel state metrics by applying the quantization ranges indicated by the quantization parameter;
an indication determiner configured to determine respective control indications indicative of respective quantized channel state metrics; and
an indication determiner configured to transmit respective signals indicating the respective determined control indications from the respective radio communication devices as respective random access transmissions to the radio communication station.

42. The method of claim 41, wherein the quantization parameter is indicative of a threshold.

43. The system of claim 41, wherein the quantization parameter is derived depending on a characteristic of the radio communication system.

44. The system of claim 43, wherein the characteristic of the radio communication system is derived from signals received on a random access channel from a plurality of radio communication devices.

45. The system of claim 44, wherein the respective signals received on the random access channel indicate respective control indications indicative of a quantized respective channel state metric of respective radio communication devices, and wherein the system comprises a indication deriver configured to derive the control indications from the signals received on the random access channel, and wherein deriving the quantization parameter depends on a characteristic of the radio communication system, and comprises deriving the quantization parameter depending on the control indications.

46. A method of operating a radio communication station in a radio communication system having a plurality of radio communication devices, the method comprising:
deriving a quantization parameter depending on the control indications, the deriving includes adjusting the quantization parameter depending on the frequency of the different control indications to reduce the frequency of occurrence of the most frequently occurring control indications;
transmitting the quantization parameter to the radio communication devices for use in subsequent quantization of a channel state metric; and
receiving signals as random access transmissions from the plurality of radio communication devices, the signals indicating control indications indicative of a channel metric quantized with the quantization parameter.

47. The method of claim 46, comprising deriving the control indications from the signals.

48. The method of claim 46, wherein different sets of control indications are indicated by different time and/or frequency resource slots to the radio communication station.

49. The method of claim 46, wherein the quantization parameter is indicative of a threshold.

50. The method of claim 46, wherein the quantization parameter is indicative of quantization ranges at least some of which have unequal width to provide a more uniform distribution than equally spaced ranges and a substantially uniform distribution of data bits in the ranges.

51. The method of claim 46 of operating a radio communication station, wherein the radio communication station derives the quantization parameter to reduce the probability of collisions between transmissions of the radio communication devices.

52. The method of claim 46 of operating a radio communication station, wherein the radio communication station derives the quantization parameter to indicate a plurality of quantization ranges.

53. The method of claim 46, of operating a radio communication station, wherein the quantization parameter is indicative of quantization ranges at least some of which have unequal width to provide a more uniform distribution of data bits between different ranges than equally spaced ranges and a substantially uniform distribution of data bits within the ranges, than would be provided by equal width ranges.

54. A tangible computer-readable storage non-transitory storage medium, being any media that is not a transitory propagating signal or wave, configured with instructions and control data, of controlling the operation of a (Universal Mobile Telecommunication System Long Term Evolution) or UMTS LTE radio communication system having a plurality of radio communication devices, the storage-medium being configured to control the UMTS LTE radio communication station to:
- receive respective signals on a random access channel from the plurality of radio communication devices;
- derive a characteristic of the radio communication system from the received respective signals;
- derive a quantization parameter depending on the characteristic; and
- transmit the quantization parameter to the plurality of radio communication devices for subsequent respective quantizations of respective channel state metrics.

55. A tangible computer-readable storage non-transitory storage medium, being any media that is not a transitory propagating signal or wave, configured with instructions and control data, of controlling the operation of a (Universal Mobile Telecommunication System Long Term Evolution) or UMTS LTE radio communication system having a plurality of radio communication devices, the storage-medium being configured to control the UMTS LTE radio communication station to:
- receive a quantization parameter from the radio communication station;
- determine a channel state metric;
- quantize the determined channel state metric by applying quantization ranges indicated by the quantization parameter;
- determine a control indication indicative of the quantized channel state metric; and transmit a signal indicating the determined control indication as a random access transmission to the radio communication station.

56. A method of operating a radio communication station in a radio communication system having a plurality of radio communication devices, comprising:
- deriving a quantization parameter configured for use by radio communication devices in subsequent quantizing of a channel state metric; and
- transmitting the quantization parameter to the radio communication devices for use in subsequent quantizing of a channel state metric.

* * * * *